United States Patent
Byers et al.

(10) Patent No.: US 6,907,035 B1
(45) Date of Patent: Jun. 14, 2005

(54) MASTER CONTROLLER FOR A FLEXIBLE SWITCHING SYSTEM

(75) Inventors: Charles Calvin Byers, Aurora, IL (US); Kevin Eugene Dombkowski, Oswego, IL (US); John Frederick Heck, Wheaton, IL (US); Mark Alan Lassig, Naperville, IL (US); Reinhard Metz, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 904 days.

(21) Appl. No.: 09/593,184

(22) Filed: Jun. 13, 2000

(51) Int. Cl.7 .............................................. H04L 12/66
(52) U.S. Cl. .................................. 370/355; 379/201.05
(58) Field of Search ........................ 370/250, 351–357, 370/360, 361, 367, 385, 386, 387, 388, 398, 395.2, 395.32, 395.5, 229–230, 235, 236.2, 231, 241.1, 395.1–395.3, 396; 379/201.05, 203.03, 201.12, 269, 229–230, 114.24, 114.21, 114.15

(56) References Cited

U.S. PATENT DOCUMENTS

| | | | | |
|---|---|---|---|---|
| 4,620,066 A | * | 10/1986 | Bushnell et al. ............ | 379/223 |
| 5,434,852 A | * | 7/1995 | La Porta et al. ............ | 370/385 |
| 5,608,788 A | * | 3/1997 | Demlow et al. ....... | 379/142.07 |
| 5,649,108 A | * | 7/1997 | Spiegel et al. .............. | 709/241 |
| 6,026,151 A | * | 2/2000 | Bauer et al. ........... | 379/114.24 |
| 6,226,373 B1 | * | 5/2001 | Zhu et al. .............. | 379/207.02 |
| 6,243,382 B1 | * | 6/2001 | O'Neill et al. ......... | 370/395.52 |
| 6,442,164 B1 | * | 8/2002 | Wu ....................... | 370/395.21 |
| 6,470,081 B1 | * | 10/2002 | Sbisa et al. ............ | 379/221.09 |
| 6,628,646 B1 | * | 9/2003 | Angle et al. ................ | 370/355 |
| 6,633,565 B1 | * | 10/2003 | Bronstein et al. ........... | 370/392 |

\* cited by examiner

*Primary Examiner*—Dang Ton
*Assistant Examiner*—Phuc Tran

(57) ABSTRACT

A method and apparatus for controlling telecommunications call processing is disclosed. In a switching system, a Master Controller is provided for maintaining the database of the system, and for receiving call processing control messages. The Master Controller receives these messages via a core switching fabric network of the switching system. The Master Controller selects one of a plurality of feature processors, the feature processors being of several types for processing different features, to process the received call processing message. The Master Controller, if necessary, transmits not only the call processing message, but also state information about the call to the selected feature processor. The feature processor processes the message, and returns call state update data to the Master Controller. The feature processor also transmits messages for controlling other units in order to implement the desired response to the received call processing message. Advantageously, the centralized Master Controller allows a plurality of different types of feature processors to be used, and maintains a record of which feature processors are performing properly so that call control messages are only sent to working feature processors. Advantageously, a single database (duplicated for reliability), is maintained for a plurality of different types of feature processors.

23 Claims, 3 Drawing Sheets

MASTER CONTROLLER FOR A FLEXIBLE SWITCHING SYSTEM

TECHNICAL FIELD

This invention relates to the control of telecommunications switching systems.

Problem

Ever since their introduction in 1965, stored program controlled electronic switching systems have imposed severe challenges on the development of control software for processing calls. These challenges have become ever more severe as the number and type of features offered in such systems has increased during the past three decades. The requirement for reliable service has meant that the introduction of each new feature required extensive testing in order to ensure that no residual software bugs would cause a system to crash.

In recent years there has been increasing pressure to allow individual telephone carriers and end users to program their own features. The manufacturers have resisted this pressure because of the danger that the introduction of a new feature with a program fault could cause a system crash.

The nature of the control problem has changed substantially as the switching systems and network have moved toward packetized transmission and switching arrangements, which have resulted in a message oriented telecommunications feature request system wherein requests for the invoking of a feature, or for any state transition of a call, are received in a switching system as a packetized message.

Very large switching systems and packet switching fabrics are becoming available, and with them there is an opportunity for the implementation of features on a more and more centralized basis. However, in order to utilize such large switching systems for implementing features, it is necessary to have a highly reliable call processing control arrangement which allows for the use of less reliable software and hardware modules to execute the extensive processing load associated with individual features. The Master Controller also provides load sharing among multiple identical feature servers.

Solution

The above problem is solved and an advance is made over the prior art in accordance with Applicants' invention, wherein a Master Controller receives all initial call processing request messages and dispatches the message to one of a plurality of feature processors for performing the call processing function associated with the received message. The feature processor then generates one or more call control messages, causing the desired call processing result. These messages are then sent to other switching systems or are used within the switching system to control peripheral equipment of the call. The term switching system as used herein refers to the complete entity shown, for example, in FIG. 1. The switching system contains a core switching fabric for performing the function of switching packets or establishing circuit connections for the switching system.

In accordance with one feature of the invention, the Master Controller maintains the database for the switching system. Advantageously, as the centralized controller, it is then in a position to provide data for a call to any feature processor.

In accordance with another feature of Applicants' invention, the centralized controller is made highly reliable. This allows it to be the depository of translation information as well as long term call state information, so that any call processing requests can be forwarded to any feature processor along with all required call state and translation information. A stateless feature processor, i.e., a feature processor which retains no state information for a call after it has finished processing a segment of the call, need not be as reliable as a conventional feature processor that retains such state information, because a failure can be quickly detected and has no effect on other calls. Advantageously, this means that commercially available general purpose feature processors can be used.

In accordance with another feature of Applicants' invention, call billing records are maintained in the Master Controller. Advantageously, since the Master Controller has the primary control over the disposition of all call processing messages received in the switching system, it is in a position to extract the information needed for all billing records.

In one specific embodiment of Applicants' invention, a large core switching fabric, a packet switch using a protocol such as Internet Protocol (IP), or Asynchronous Transfer Mode (ATM), is used to interconnect line access apparatus, trunk access apparatus, wide band trunks, ATM trunks, IP trunks, network resource servers such as voice mail systems, operations, administration, maintenance and provisioning processors for maintaining high level control of the switch system, and the master control processor and feature servers. Communication among these inputs is provided by the core switching fabric which recognizes a destination for any message through information stored in headers of the packets that it switches. When another switching system sends an initial call processing request to this switching system, it uses the address of the Master Controller in order to steer the message to that unit. The Master Controller then steers a feature request message to a selected feature processor by providing the address of the feature processor in the header of packets of the feature control message. Advantageously, the core switching fabric is used for all inter-unit communications of the switching system.

BRIEF DESCRIPTION OF THE DRAWING(S)

DETAILED DESCRIPTION

Figure 1:
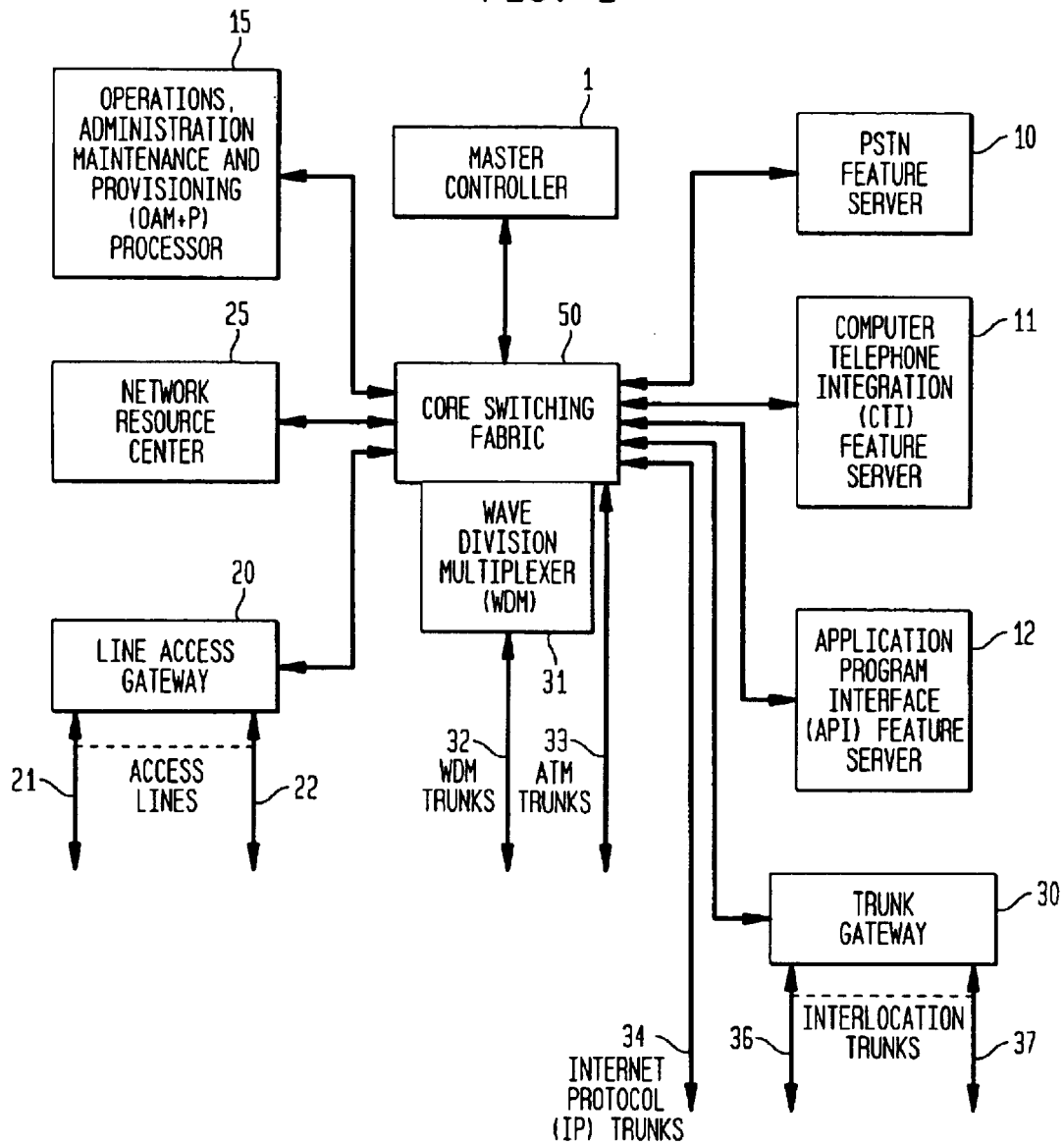
FIG. 1 is a block diagram of a switching system in accordance with Applicants' invention.

FIG. 1 is a block diagram of a switch arranged in accordance with Applicants' invention. The switch contains a core packet switch 50, which is a high throughput switch having inputs and outputs at bit rates up to the OC-192 (10 gigabit/second) rate.

The core switch 50 is connected to a Master Controller 1 whose functions will be described in more detail hereinafter. The core packet switch is also connected to feature servers such as a Public Switched Telephone Network (PSTN) feature server 10 for providing call processing for "legacy" functions, i.e., functions which re-use code from prior art systems. A plurality of such PSTN feature processors is provided in order to make it possible for the switch to handle a large load, and to survive if one or more of the PSTN feature servers develops a fault.

In addition to the PSTN feature servers, the core network 50 is also connected to other feature servers for providing features that have been programmed without being integrated into the PSTN feature software system. Examples are computer telephone integration (CTI) feature server 11, and application programming interface (API) feature server 12, which provide arrangements wherein carriers or other parties other than the switching system manufacturer can provide software for implementing features without requiring the features to be integrated into the PSTN feature server software.

The core switching fabric switch 50 is also connected to an operations, administration, maintenance, and provisioning (OAM&P) processor 15 for providing overall control messages to, and receiving overall control messages from the switching system. The core switching fabric 50 is also connected to network resource servers 25, such as a voice mail system, a speech recognition system, or a tone digit receiver/transmitter system. Modern telecommunication switching systems are connected via such network resource servers.

The core switching fabric is also connected to a line access gateway 20 for interfacing with all types of lines and line systems, including ordinary telephone lines (POTS= Plain Old Telephone Service), integrated service digital network (ISDN) lines, coin lines, digital subscriber loop lines, fiber to the home facilities, feature phone lines, hybrid fiber core (cable modems), wireless systems, satellite systems, (e.g., low earth orbit satellite data systems), Ethernet systems, loop carrier systems, trunk or Private Branch Exchange (PBX) interfaces such as T-1 or E-1, and interface systems for interfacing with remote or local lines 21, . . . , 22. The line access gateway multiplexes the various source signals into DS-3, OC-3, and OC-12 signals for communicating with the core packet switch 50. The core switching fabric also interfaces with a wave division multiplex unit 31, which is connected to wave division multiplex trunks 32 to asynchronous transfer mode (ATM) trunks 33, and to Internet protocol (IP) trunks 34. These trunks operate at an OC-12 (622 Mbits/second) or faster rate, and are therefore, directly connectable to the core switching fabric. In addition, the core switching fabric communicates with a trunk gateway 30, which is used as a gateway to the public switched telephone network (PSTN) over synchronous trunks 36, . . . 37, such as T-1 and E-1 trunks, multiplexed digital trunks, such as DS-3 and E-3 trunks, OC-3 and OC-12 synchronous signals, Ethernet signals, and signals from the SS7 signaling network.

Applicants will now discuss the functions of the Master Controller. Broadly speaking, the Master Controller is responsible for the centralized control and supervision of the various types and instances of feature servers that provide the call control and call processing functions of the switching system. The Master Controller is a fault tolerant database management computer cluster. Its basic functions include storing information about the configuration of a particular central office, (or a portion of a large multi-location network called the domain), office or domain translations, storage of per call data, including the state of the call, and storage of customer and trunk specific static data (line and trunk translations) and dynamic data (current state data). The Master Controller, therefore, requires a large memory. It is estimated that a Master Controller for a switching system serving 100,000 subscribers, and having a core switching fabric with a throughput of 640 gigabits/second would require on the order of 32 gigabytes of storage.

The Master Controller also functions as a process distributor to steer call processing of a particular call situation to an appropriate feature server. The feature server is appropriate if it is the right type of feature server, is not marked out of service, and has adequate spare capacity.

In accordance with one aspect of Applicants' invention, the Master Controller can work with stateless feature servers. A stateless feature server does not maintain any record of a call, but acts in response to receipt of a feature request, plus all required call state data received from the Master Controller. Advantageously, this type of arrangement means that a call can be readily handled, even if an initial feature server failed after performing a first step of call processing on a call, since another feature server would serve for handling the second step, and that other feature server would receive all required state information from the Master Controller.

In addition, the Master Controller acts as a fault detection, isolation, and recovery master of its switch or domain. It detects faults, failures in any element in its domain, and acts as a center for recovery processor by re-configuring network elements, facilities, or processors around faults. It avoids sending call processing messages to failed processors, and starts sending call processing messages to such processors after they have been repaired, and have recovered from their failure. Stateless feature processor can use commercial, off the shelf, work stations, which have cost and density advantages. Faults in such commercial units are frequently difficult to diagnose.

The feature processor can be arranged to run periodic checks on their own sanity and to generate "heartbeat" messages to the Master Controller when these checks are satisfactory. The Master Controller can then check to insure that the heartbeat messages are being received in a timely manner. In addition, the Master Controller can request performance of special tests, periodically, or if there is a reason to believe that a feature processor may be defective.

When the Master Controller is communicating with a state-full feature server, i.e., a feature server which has been programmed to retain at least some state information for the duration of the call, the Master Controller still maintains back-up state information so that if there is a failure of the state-full feature processor, another processor can be initialized with the state information retained in the master controller.

In the preferred system, all state-transitions are reported as messages to the Master Controller. The Master Controller then selects an appropriate feature server to provide the call processing feature logic, and if that feature server is a stateless feature server, transmits the state information of the call to that feature server along with the state transition message. The Master Controller keeps track of which feature servers are heavily loaded, in order to distribute the load to less heavily loaded feature processors.

The Master Controller also functions to provide load balancing among a plurality of identical feature servers by steering more traffic to the less heavily loaded of these feature servers.

There are often several competing network providers who provide access feature services or transport for a network. The Master Controller acts as a centralized referral bureau providing a comparably efficient interface to all providers.

In alternative embodiments, certain classes of messages directed to a state-full feature server can be sent directly without passing through the Master Controller. The advantage is a reduction of Master Controller work load. The disadvantage is that some call processing events, those related to billing, for example, may need extra messages to the controller. Also, the discovery of problems in a feature processor is likely to take longer. As mentioned earlier, this technique cannot be used for communicating with stateless feature processors.

For the networks that provide user mobility, the Master Controller performs the initial user registration functions so that calls may be delivered to a switch serving a mobile user in that user's present location.

The Master Controller is an ideal controller for performing central billing functions, although, if desired, it and the feature processors can transmit billing messages to a separate billing processor.

While FIG. 1 shows a separate OAM&P processor, many of the OAM&P functions can be readily provided from the Master Controller. For example, the Master Controller is a logical place for providing software update information to all elements in a domain, for maintaining the current status of all elements of the switching system, including all ports, for initiating fault recovery steps, and for performing short term load balancing.

Figure 2:
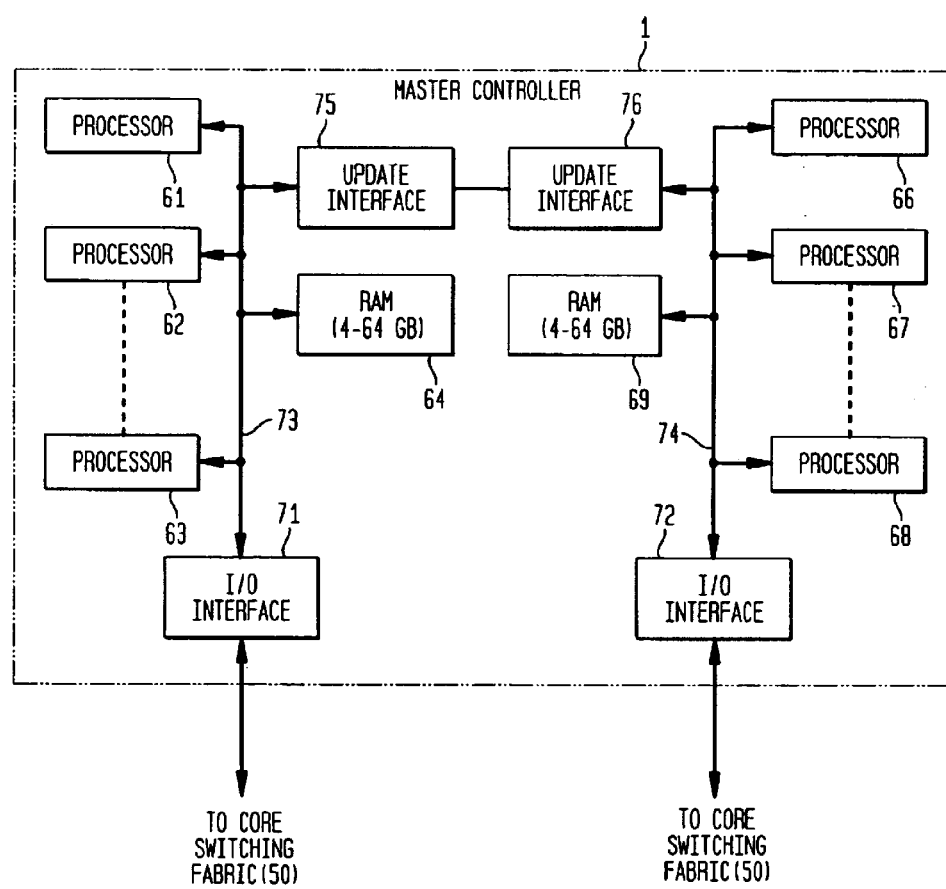
FIG. 2 is a detailed diagram of the Master Controller.

FIG. 2 is a block diagram of one preferred embodiment of the Master Controller. The unit shown is a duplicated unit in order to provide high reliability. The unit is connected to the core network 50 by I/O interfaces 71 and 72. These interfaces operate at the OC-12 level. Each of the duplicate units of the Master Controller contains a plurality of processors 61, 62, . . . , 63, and 66, 67, . . . , 68. These processors are connected to a bus from an IO interface. Also connected to the bus is a random access memory (RAM) 64, 69, with storage capacity of up to 64 gigabytes. In case of failure, each of the buses 73, 74, is connected to an update interface 75, 76. The update interfaces in turn are connected. If one of the paths of the Master Controller fails after a repair has been completed, that Master Controller has its memory updated using the path through the update interfaces 75, 76. Updating of a newly repaired processor or RAM is a background process, so that call processing can continue without interruption.

Figure 3:
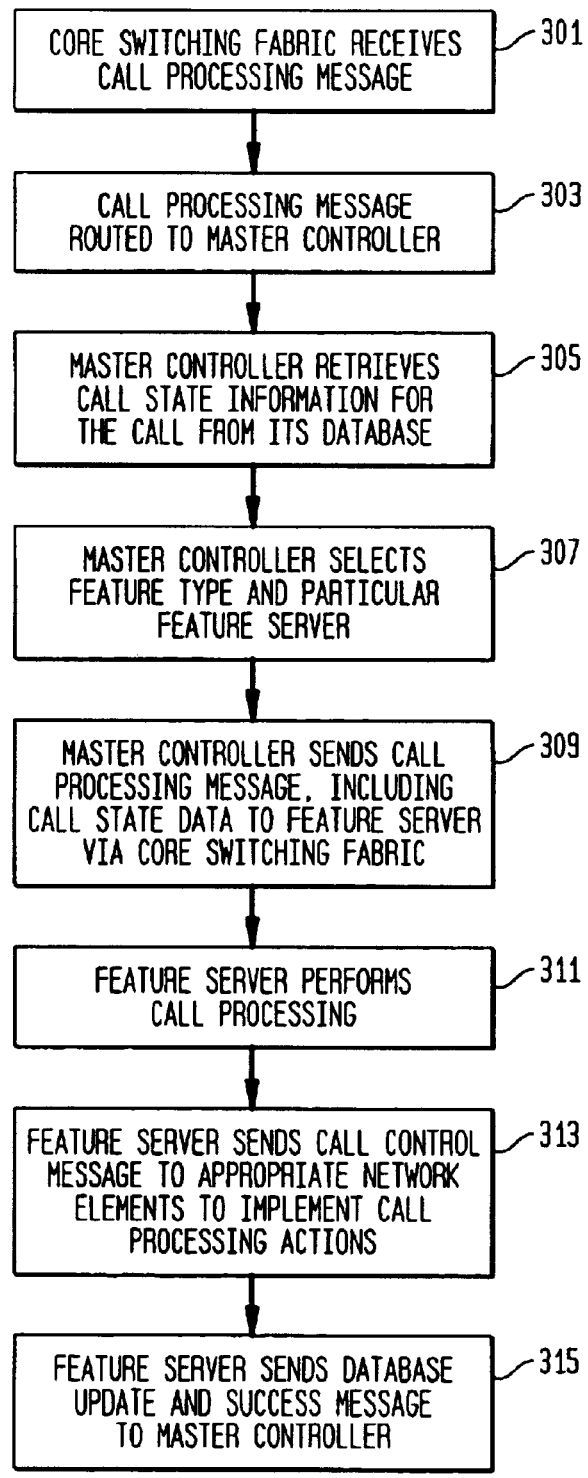
FIG. 3 is a flow diagram illustrating the basic operation of Applicants' invention.

FIG. 3 is a flow diagram illustrating the operation of Applicants' invention. The core packet switch 50 receives a call processing message, (Action Block 301). The call processing message is routed (via information stored in the header), to the Master Controller, (Action Block 303). The Master Controller retrieves call state information for the call from its database, (Action Block 305). The Master Controller selects a feature server of the right type, (Action Block 307), and in selecting the specific feature server, the Master Controller makes sure that it does not select a feature server that has been placed out of service, (for example, due to a fault), and that one is not overloaded. The Master Controller sends a call processing message, including all appropriate call state data to the selected feature server via the core packet switch, (Action Block 309). The selected feature server performs call processing, (Action Block 311). The feature server sends call control messages to the appropriate network elements in order to accomplish the tasks required in call processing, (Action Block 313). The feature server sends database update and success messages to the Master Controller, (Action Block 315). Thereafter, the Master Controller is able to handle subsequent call processing messages for that call.

The preferred emodiment uses a packet core switching fabric. However, a combined packet and circuit switching fabric such as that used in Lucent's 7 R/E system can also be used, wherein the packet switching fabric is used for switching short duration packet virtual circuits, while long duration circuits for carrying packets between two points can be switched over a circuit connection.

The above description is of one preferred embodiment of Applicants' invention. Many other embodiments will be apparent to those of ordinary skill in the art, without departing from the scope of the invention. The invention is only limited by the attached Claims.

What is claimed is:

1. Apparatus for performing call control functions in a packetized telecommunications switch comprising:
    a core switching fabric for transmitting traffic channels and call control messages from an input to an output;
    a Master Controller connected to said core switching fabric;
    a plurality of feature servers connected to said core switching fabric for performing call processing functions;
    said Master Controller for receiving call processing request messages, and for transmitting call processing request messages to a selected one of said plurality of feature servers;
    said feature servers for generating call control messages for transmission via said core switching fabric to peripheral equipment for implementing a call control function specified in a call control message;
    wherein all call processing request messages are processed by said plurality of feature servers.

2. The apparatus of claim 1, wherein said core switching fabric comprises a circuit switching fabric for establishing call traffic connections.

3. The apparatus of claim 1, wherein said core switching fabric comprises a packet switching fabric for transmitting said call control messages.

4. The apparatus of claim 3, wherein said plurality of feature servers comprises a plurality of different types of feature servers for processing different kinds of call processing request messages.

5. The apparatus of claim 4, wherein said core switching fabric is connected to trunk access interface means.

6. The apparatus of claim 4, wherein said Master Controller performs the function of accumulating billing records.

7. The apparatus of claim 4, wherein at least one of said types of feature servers retains no state information for a call after it has completed processing one of said call processing request messages.

8. The apparatus of claim 7, wherein all call processing request messages for a feature server that retains no state information for a call are routed via said Master Controller.

9. The apparatus of claim 3, wherein said plurality of different types of feature servers comprises a plurality of at least one type of feature server.

10. The apparatus of claim 3, wherein said Master Controller transmits call state information to said selected one feature server.

11. The apparatus of claim 3, wherein said Master Controller comprises duplicated equipment.

12. The apparatus of claim 11, wherein each of the duplicated equipments of said Master Controller comprises a plurality of processors.

13. The apparatus of claim 3, wherein said Master Controller comprises duplicate equipments interconnected by update interface means for rapidly updating memory of one of said duplicated equipments from another of said duplicate equipments.

14. The apparatus of claim 3, wherein said core switching fabric is connected to line access interface means.

15. Apparatus for performing call control functions in a packetized telecommunications switch comprising:
- a core switching fabric for transmitting traffic channels and call control messages from an input to an output;
- a Master Controller connected to said core switching fabric;
- a plurality of feature servers connected to said core switching fabric for performing call processing functions;
- said Master Controller for receiving call processing request messages, and for transmitting call processing request messages to a selected one of said plurality of feature servers;
- said feature servers for generating call control messages for transmission via said core switching fabric to peripheral equipment for implementing a call control function specified in a call control message;
- wherein said core switching fabric comprises a packet switching fabric for transmitting said call control messages;
- wherein said plurality of feature servers comprises a plurality of different type of feature servers;
- wherein at least one of said types of feature servers retains state information for a call after it has completed processing one of said call processing request messages.

16. The apparatus of claim 15, wherein ones of said call processing messages destined for one of said feature servers which retain state information for a call are routed directly to that feature server, bypassing said master controller.

17. A method of processing calls in a switching system comprising the steps of:
- said switching system receiving a call processing request message;
- said switching system routing said call processing request message to a Master Controller;
- said Master Controller receiving and retrieving call state information for the call and terminals of the call from its database;
- said Master Controller selecting one of a plurality of feature servers;
- said Master Controller sending call processing request messages, including call state data to the selected feature server via a core switching fabric of said switching system;
- said feature server performing call processing for said call; and
- said feature server sending database update and success messages for said call to said Master Controller;
- wherein all call processing request messages are processed one by one of said plurality of feature servers.

18. The method of claim 17, further comprising the step of said selected feature server sending call control messages to appropriate network elements to implement call processing actions.

19. The method of claim 18, wherein said selected feature server sends said call control messages over said core switching fabric.

20. A method of processing calls in a switching system comprising the steps of:
- said switching system receiving a call processing request message;
- said switching system routing said call processing request message to a Master Controller;
- said Master Controller receiving and retrieving call state information for the call and terminals of the call from its database;
- said Master Controller selecting one of a plurality of feature servers;
- said Master Controller sending call processing request messages, including call state data to the selected feature server via a core switching fabric of said switching system;
- said feature server performing call processing for said call; and
- said feature server sending database update and success messages for said call to said Master Controller;
- wherein at least one feature server retains no state information for a call after it has completed processing one of said call processing request messages, further comprising the step of routing all call processing request messages for a feature server that retains no state information for a call via said Master Controller.

21. A method of processing calls in a switching system comprising the steps of:
- said switching system receiving a call processing request message;
- said switching system routing said call processing request message to a Master Controller;
- said Master Controller receiving and retrieving call state information for the call and terminals of the call from its database;
- said Master Controller selecting one of a plurality of feature servers;
- said Master Controller sending call processing request messages, including call state data to the selected feature server via a core switching fabric of said switching system;
- said feature server performing a processing for said call; and
- said feature server sending database update and success messages for said call to said Master Controller;
- wherein at least one of said feature servers retains state information for a call after it has completed processing one of said call processing request messages, further comprising the step of:
- routing ones of said call processing messages destined for one of said feature servers which retain state information for a call directly to that feature server, bypassing said Master controller.

22. A method of processing calls in a switching system comprising the steps of:
- said switching system receiving a call processing request message;
- said switching system routing said call processing request message to a Master Controller;
- said Master Controller receiving and retrieving call state information for the call and terminals of the call from its database;
- said Master Controller selecting one of a plurality of feature servers;
- said Master Controller sending call processing request messages, including call state data to the selected feature server via a core switching fabric of said switching system;
- said feature server performing call processing for said call; and said feature server sending database update and success messages for said call to said Master Controller;

wherein a plurality of said plurality of feature servers are identical, and wherein said Master Controller selects one of the plurality of identical feature servers in such a manner as to provide load balancing among the plurality of identical feature servers.

23. Apparatus for performing call control functions in a packetized telecommunications switch comprising:

a core switching fabric for transmitting traffic channels and call control messages from an input to an output;

a Master Controller connected to said core switching fabric;

a plurality of feature servers connected to said core switching fabric for performing call processing functions;

said Master Controller for receiving call processing request messages, and for transmitting call processing request messages to a selected one of said plurality of feature servers;

said feature servers for generating call control messages for transmission via said core switching fabric to peripheral equipment for implementing a call control function specified in a call control message;

wherein said core switching fabric comprises a packet switching fabric for transmitting said call control messages;

wherein said plurality of feature servers comprises a plurality of different types of feature servers;

wherein at least one feature server retains no static information for a call after it has completed processing one of said call processing messages; and wherein all call processing messages for said at least one feature server are routed via said master controller.

* * * * *